United States Patent [19]

Mahadevan et al.

[11] Patent Number: 4,657,639
[45] Date of Patent: Apr. 14, 1987

[54] APPARATUS FOR ELECTROSTATIC FILTRATION OF $N_2O_4$ FOR REMOVAL OF SOLID AND VAPOR CONTAMINANTS

[75] Inventors: Parameswar Mahadevan, Fullerton; Elfreda T. Chang, Los Angeles; Peter Breisacher, Palos Verdes Peninsula, all of Calif.

[73] Assignee: The United States of America as represented by the Secretary of the Air Force, Washington, D.C.

[21] Appl. No.: 740,107

[22] Filed: May 31, 1985

[51] Int. Cl.$^4$ .................. B01D 3/00; B01D 13/02; B01D 46/00
[52] U.S. Cl. .................. 202/182; 202/185 R; 202/200; 202/241; 202/267 R; 55/155; 55/DIG. 39; 203/4; 203/41; 203/86; 203/DIG. 2; 204/308; 210/243; 210/446; 423/400
[58] Field of Search ............ 203/4, 41, 39, 40, 86, 203/DIG. 2, 99, DIG. 7; 202/182, 197, 267, 241, 202, 200, 185.1; 423/400; 204/186, 302, 308; 55/155, DIG. 39; 210/243, 767, 640, 446; 159/DIG. 26

[56] References Cited

U.S. PATENT DOCUMENTS

| | | | |
|---|---|---|---|
| 1,258,562 | 3/1918 | Harris | 202/158 |
| 2,342,366 | 2/1944 | Podbielniak | 202/185.5 |
| 2,619,452 | 11/1952 | Jones et al. | 203/4 |
| 2,852,446 | 9/1958 | Bromberg | 203/4 |
| 3,063,804 | 11/1962 | Morrow | 423/400 |
| 3,070,425 | 12/1962 | Grossmann | 423/400 |
| 3,306,829 | 2/1967 | Patterson et al. | 202/185.1 |
| 3,687,834 | 8/1972 | Candor | 204/186 |
| 4,139,595 | 2/1979 | Vaseen | 423/400 |
| 4,264,331 | 4/1981 | Klein et al. | 436/151 |
| 4,308,105 | 12/1981 | Schiffers et al. | 202/197 |

OTHER PUBLICATIONS

Jan Van Turnhout et al., "Electret Filters for High-Efficiency and High-Flow Air Cleaning," IEEE Transactions, vol. 1A-17, No. 2, Mar./Apr. 1981, 240-247.
Mahadevan, "Space Fuel Successfully Purified in Lab," Orbiter, vol. 23, No. 17, Aug. 3, 1983.
Mahadevan, Inside R & D, vol. 12, No. 33, Aug. 17, 1983.

Primary Examiner—Wilbur Bascomb
Attorney, Agent, or Firm—Stanton E. Collier; Donald J. Singer

[57] ABSTRACT

An electrostatic filtration apparatus is used to significantly reduce contaminants in $N_2O_4$ vapor and liquid at ambient temperatures. The apparatus uses an electret vapor filter having therein a stack of layers of electret material through which the $N_2O_4$ must pass. A flow blocking filter is added to the electret liquid filter to insure a sufficient time for removal of contaminants by said electret material. The filter is constructed of chemically inert materials to prevent additional contaminants.

1 Claim, 3 Drawing Figures

APPARATUS FOR ELECTROSTATIC FILTRATION OF N$_2$O$_4$ FOR REMOVAL OF SOLID AND VAPOR CONTAMINANTS

STATEMENT OF GOVERNMENT INTEREST

The invention described herein may be manufactured and used by of for the Government for governmental purposes without the payment of any royalty thereon.

BACKGROUND OF THE INVENTION

The present invention relates generally to a process and apparatus of purifying a liquid, and, in particular, relates to a process and apparatus for purifying N$_2$O$_4$ that is used as a propellant.

It has been known since the late 1960's that N$_2$O$_4$ propellant shipped and stored in mild steel containers may contain deleterious amounts of corrosion products (i.e., particulate and colloidal iron nitrate adduct contaminants) which can cause filter clogging or flow decay and leakage. This can result in the reduction of oxidizer flow to the combustion chamber in thrusters which in turn may have major effects upon delicate orbital correction maneuvers. Therefore, it is essential that these contaminants in N$_2$O$_4$ be eliminated or reduced prior to loading the propellant onto space launch vehicles.

A prior process for reducing iron contaminants to around 0.5 ppm requires chilling the propellant to below 40° F. The lower temperature reduces the solubility of the contaminants in N$_2$O$_4$. This is followed by filtration of the chilled propellant through a fine membrane filter (5 micron Teflon). Although this process has achieved its goal of reducing contaminants, there are several derawbacks: (1) Chilling and filtering large quantities of propellant are costly and very time consuming operations; (2) Due to the sometimes gelatinous and colloidal nature of the iron contaminants, filtration through fine membrane filters may not always be effective for removing iron contaminants from N$_2$O$_4$; and (3) The effectiveness of removing gelatinous material by filtration is known to be highly pressure dependent.

Another prior process is by distillation. However, an additional step required in the prior laboratory distillation process was a complete degassing prior to the start of distillation by freezing and evacuating. This removed NOCl and volatile iron contaminants. This step is also extremely slow and costly for large quantities of propellants.

Filtration of N$_2$O$_4$ at ambient temperatures through a 10 micron Teflon filter by itself showed no reduction in iron concentration.

The above drawbacks have motivated a search for a process and apparatus to purify N$_2$O$_4$.

SUMMARY OF THE INVENTION

The instant invention sets forth a process and an apparatus for removing contaminants from N$_2$O$_4$ using an electret vapor filter during distillation and an electret liquid filter.

Warmed N$_2$O$_4$ in a still creates a high pressure vapor phase thereover. Because of the high pressure, the vapor of N$_2$O$_4$ and contaminants therein is forced through an electret vapor filter that removes iron contaminants but also NOCl and volatile iron contaminants. The filtered vapor flows into a cooled receiver wherein the vapor of N$_2$O$_4$ condenses.

The liquid filter consists of layers of electret material with a 10 micron filter on the output side to increase the residence time of the liquid propellant in the filter column. Teflon washers were placed about the filter column and between the layers to prevent the bypassing of the electret material by the liquid. The vapor filter is similarly constructed except the 10 micron filter is not required. The electret material can be polypropylene or Teflon, for example.

One object of the present invention is to provide an apparatus for removing contaminants from N$_2$O$_4$.

Another object of the present invention is to provide an apparatus to remove colloidal, particulate, and volatile iron contaminants from N$_2$O$_4$.

Another object of the present invention is to provide an electret vapor filter for removing contaminants.

Another object of the present invention is to provide a filtration process that is carried out at about ambient temperatures.

These and many other objects and advantages of the present invention will be readily apparent to one skilled in the pertinent art from the following detailed description of a preferred embodiment of the invention and the related drawings.

DETAILED DESCRIPTION OF THE PREFERRED EMBODIMENT

Figure 1:
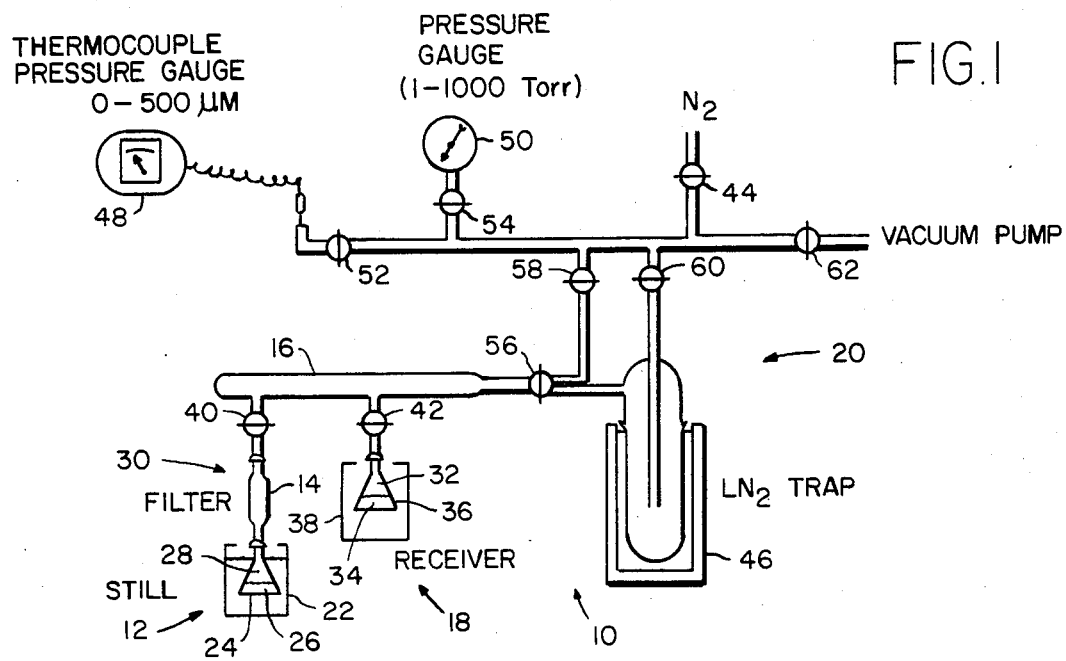
FIG. 1 illustrates schematically one of the apparatus of the present invention.

Referring to FIG. 1, a distillation apparatus 10 is shown.

Distillation apparatus 10 has therein a still 12, a vapor filter 14, a manifold 16, a receiver 18, and a cleansing section 20.

Still 12 has a temperature control means such as a water bath 22 that is typically maintained at an operating temperature of about 100±5° F.

Water bath 22 surrounds a container 24 having therein a liquid 26 of N$_2$O$_4$. Because of the temperature of N$_2$O$_4$ established by bath 22, a vapor phase 28 exists above liquid 26 at an increased pressure P$_1$.

As a result of a lower pressure, P$_2$, existing on an output end 30 of filter 14, vapor is forced through filter 14 into manifold 16 and into a receiver 18 wherein a filtered vapor 32 condenses into a purified liquid 34 of N$_2$O$_4$. Filtered vapor 32 condenses because a cooling bath 38 of ice at 32° F. or liquid nitrogen at −320° F. is maintained in contact with a condenser container 36 and filtered vaport 32. Stopcocks 40 and 42 are appropriately opened and closed during the process.

Cleansing section 20 is used to remove N$_2$O$_4$, NO; NOCl, etc. from apparatus 10 after use. Gaseous nitrogen is introduced through stopcock 44 and circulated through manifold 16 and into trap 46 which is cooled by liquid nitrogen. As a result N$_2$O$_4$, NOCl, NO, etc. are frozen therein. A vacuum pump degases trap 46. Vacuum gauges 48 and 50 are used to monitor apparatus 10. Stopcocks 52, 54, 56, 58, 60 and 62 are also appropriately controlled during this process.

As noted above, vapor 28 is caused to flow through filter 14 because of a pressure differential $\Delta P = P_1 = P_2$. The vapor filter 14 is a column packed with layers of electret.

Figure 2:
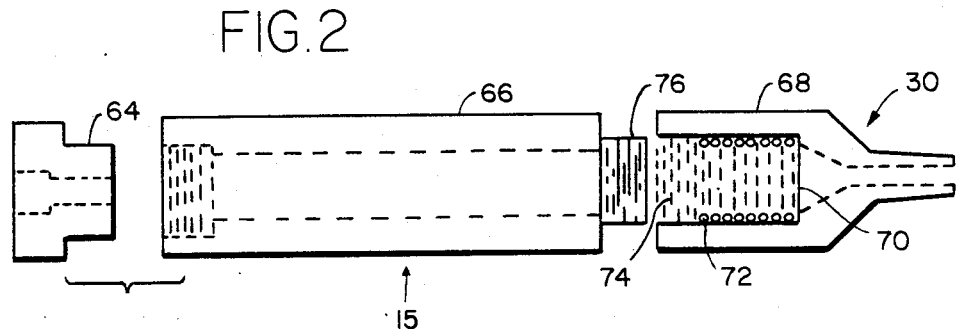
FIGS. 2 and 3 illustrate liquid filters of the present invention.

The liquid filter 15 shown in FIG. 2 is constructed preferably of Teflon or of other non-reactive material. Filter 15 has an input cap 64 that is connected to a flow section 66, and a filtering section 68 with an output end 30. Filtering section 68 has stacked in layers filtering electret material 74. Teflon washers 72 are placed between the layers to prevent the flow of liquid around the layers of electret material 74. Flow section 66 has a threaded insert 76 that is threaded into filtering section 68 and further compresses washers 72 onto filter material 74. In order to increase the resident time of liquid propellant in material 74 a 10 micron blocking filter 70 is placed after filter material 74.

For purposes of comparison, filtration runs using a 304.L stainless steel holder were made. The iron contaminant in $N_2O_4$ before and after filtration was determined by atomic absorption (AA) spectroscopic analysis. Comparison of test data are given in Table I. Filtration of liquid $N_2O_4$ at ambient temperature through a 10 micron Teflon filter by itself showed no reduction in iron concentration.

tance from the fibers so that the filter pack can be relatively porous. Mechanical resistance to flow can thus be reduced appreciably in comparison with standard mechanical filters which trap or slow particles by interception, impingement, diffusion or sieving.

Material 74 is strongly hydrophobic and is thermally stable against decomposition up to temperatures on the order of 100° C., and does not degas much in vacuum and has been pumped down to a pressure of $10^{-10}$ Torr, and does not react with or decompose in liquid $N_2O_4$. The filters 14 and 15 are made from micron-size polypropylene fibers. The mat is nonwoven in texture.

Effectiveness can be greatly improved in the process of distillation to obtain very pure $N_2O_4$ (i.e., 0.02 ppm Fe) by using the electret material 74 as a vapor contaminant filter during the distillation of $N_2O_4$. Previous laboratory tests showed that for complete removal of iron contaminants (by distillation) it was necessary first to remove NOCl and volatile iron contaminants by thorough degassing (i.e., freezing and evacuating) prior to the start of distillation. This is an extremely slow and

TABLE I

Room Temperature Filtration of Liquid Nitrogen Tetroxide Through Stacks of Electret Filters
REPRESENTATIVE DATA

| SERIAL NUMBER | FILTER HOLDER | IRON CONTENT (ppm) INITIAL | IRON CONTENT (ppm) FINAL | FILTER CONFIGURATION No. OF LAYERS | FILTER CONFIGURATION WEIGHT (g) |
|---|---|---|---|---|---|
| 1 | TEFLON | 0.81 | 0.41 | 16 | 3.2 |
| 2 | — | 0.84 | 0.10 | 14 | 2.8 |
| 3 | *— | 0.10 | 0.08 | 14 | 2.8* |
| 4 | — | 0.96 | 0.10 | 16 | 3.2 |
| 5 | — | 1.12 | 0.13 | 14 | 2.8 |
| 6 | STAINLESS STEEL | 0.96 | 0.24 | 16 | 3.2 |
| 7 | — | 1.0 | 0.46 | 13 | 2.6 |
| 8 | — | 0.93 | 0.39 | 13 | 2.6 |
| 9 | — | 1.12 | 0.27 | 14 | 2.8 |
| 10 | *— | 0.34 | 0.35 | 14 | 2.8* |

*The filtered samples were refiltered through the same electret stack a second time (No. 3 and 10). Filtration with the stainless steel holder yields a higher residual Iron content than with the teflon device. The lowest iron contaminent level attainable by direct filtration of $N_2O_4$ without any pre-processing is about 0.1 ppm.

The electret material 74 is made from dielectrics usually polymers such as Teflon and polypropylene. They are characterized by their ability to be electrostatically charged to high charge densities (of order $10^{-8}$ C/cm$^2$) and to retain the charge for extended periods (months to years) under relatively adverse conditions of temperature and humidity. The polymer fibers from which filter material 74 is manufactured is bipolarly charged in that they carry strong negative and positive charges that are not easily neutralized due to the high insulating property of material 74. The filters 14 and 15 thus embody a multitude of unpowered collecting electrodes in the form of charged fibers. The bipolarly charged medium thus captures adventitiously charged particulate material in its vicinity by strong coulombic attraction to either the positive or negative charges. Also uncharged particles are converted to dipoles and captured by a polarization force. The advantages of electrical forces over mechanical forces in the trapping of particles is that the former are active even at a discostly process for large quantity of propellant. The existence of volatile iron contaminants which may be polarized as $NO^+FeCl_4$ and $NO^+FE(NO_3)_4$ indicated that electrets could be effective for removing ionic species as well as eliminating NOCl from $N_2O_4$ vapors.

Over 30 distillations of different samples of contaminated $N_2O_4$ were made through different size filters. Repeated distillation through the same filter did not reveal a saturation point for the removal of volatile iron contaminants. A total volume 432 ml of $N_2O_4$ was distilled through the medium filter (6.3 g of filter material), 150 ml through the large filter (14 g), and 155 ml through the small filter (0.68 g). The iron content was reduced by all of the filters to 0.03 ppm from initial concentrations of 0.4 to 2.6 ppm respectively. A summary of these results is shown in Table II. The results for chloride reduction are not as desirable. Some reduction is noted in several cases, but consistency is not evident.

TABLE II

Distillation of $N_2O_4$ Through Electret Filters

| INITIAL CONCENTRATION (ppm) Fe | INITIAL CONCENTRATION (ppm) CHLORIDES | FINAL CONCENTRATION (ppm) Fe | FINAL CONCENTRATION (ppm) CHLORIDES | SOURCE | COMMENTS |
|---|---|---|---|---|---|
| 0.4 | 213 | 0.03 | 63 | MATHESON | MEDIUM FILTER (6.3 g) |
| 0.4 | 140 | 0.02 | 62 | | TOTAL $N_2O_4$ DISTILLED, 432 ml |
| 0.93 | 98 | 0.01 | 93 | MATHESON | SMALL FILTER (0.68 g) |
| | | | | | TOTAL $N_2O_4$ DISTILLED, 155 ml |
| 2.6 | 125 | 0.02 | 136 | Mon-3 | LARGE FILTER (14 g) |

TABLE II-continued

| Distillation of $N_2O_4$ Through Electret Filters | | | | | |
|---|---|---|---|---|---|
| INITIAL CONCENTRATION (ppm) | | FINAL CONCENTRATION (ppm) | | | |
| Fe | CHLORIDES | Fe | CHLORIDES | SOURCE | COMMENTS |
| | | | | | TOTAL $N_2O_4$ DISTILLED, 150 ml |

The reduction in iron concentration achievable by filtration of liquid at ambient temperature varied from 50 to 90% of the original contaminant level in the sample. No saturation effects were observed with any of the filter stacks. A slightly higher residual concentration of iron was detected in all samples processed in the stainless steel filter 15 compared to the ones made from Teflon. In most of the test runs, a 10 micron Teflon filter disc was used as a backing to increase the contact time of the liquid with the filter column. A pressure differential of 3 psi was maintained across the filter stacks during the filtration runs. The pressure drop across the Teflon filters is considerable in the bulk process, whereas the electret filter material 74 exhibits little resistance to flow. Since it is unnecessary to cool the $N_2O_4$ prior to filtration, major savings in time and energy are achieved. For very large quantities of $N_2O_4$, the cooling would take a considerable amount of time and would require the careful maintenance of low temperatures in the filter assembly itself. This process is always difficult, especially with poorly conducting materials like $N_2O_4$.

The prior laboratory distillation procedure for the removal of volatile iron contaminants from $N_2O_4$ is to freeze the oxidizer and then to evacuate prior to the beginning of distillation. For large quantities of $N_2O_4$ the freezing process (to 12° F.) is very energy intensive and time consuming. The pump-out is also tedious, hazardous and wasteful of raw material. The electret filter distillation process eliminates both of these steps and results in material just as low in iron content as that obtained by the freezing/evacuating process for the removal of volatile iron from liquid $N_2O_4$.

Electret filtration of liquid $N_2O_4$ is an alternate processing technique for the reduction of the iron content of the oxidizer before it is pumped into propellant tanks on flight hardware. Since filter 15 is not easily saturated, infrequent changes of the filter medium are needed. The oxidizer requires no preprocessing (such as chilling and precipitation) before filtration. For the removal of volatile iron contaminants during distillation of $N_2O_4$, electret filters appear to be extremely useful.

Figure 3:
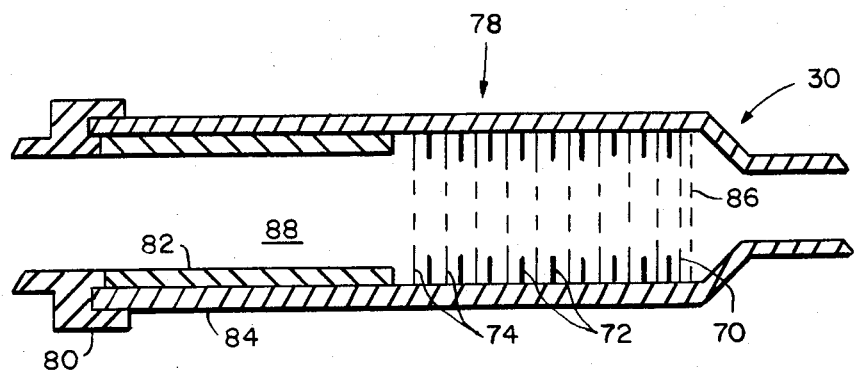

Referring to FIG. 3, a liquid propellant filter 78 is shown in cross section. A cap 80 is removably secured to a housing 84 being, for example, 3 inches in diameter and 15 inches long. An output end 30 of housing 84 has therein layers 74 of electret material in between each layer 74 of electret material is a gasket 72 which provides support to the layers 74 and prevents liquid bypassing layers 74 about the edges. A flow restrictor 70 is a 10 micron Teflon filter which is retained in position by a support 86. Layers 74 and gaskets 72 are held in position by a spacer 82 that is inserted into a void 88 above the filtering material. Filter 78 must be constructed of material resistant to attack by the propellant.

Clearly, many modifications and variations of the present invention are possible in light of the above teachings and it is therefore understood, that within the inventive scope of the inventive concept, the invention may be practiced otherwise than specifically claimed.

What is claimed is:

1. An apparatus for the electrostatic filtration of vaporous $N_2O_4$, said apparatus removing substantial amounts of iron contaminants, said apparatus comprising:

a still for forming a vapor of said $N_2O_4$, said still operating at about ambient temperatures, said vapor flowing from said still by a first pipe;

an electret vapor filter for receiving said vapor from said still by said first pipe, said electret vapor filter comprising a filtering section receiving vapor from said still and outputting a filtered vapor, said filtering section having therein a plurality of electret filter layers separated by washers, said filter having a blocking filter layer positioned downstream of said plurality of electret filter layers to increase the resident time that said vapor interacts with said filter, said filtered vapor flowing from said filter by a second pipe;

a first flow control means for receiving said filtered vapor by said second pipe and outputting said filtered vapor by a third pipe;

a manifold for receiving said filtered vapor from said first flow control means by said third pipe;

a second flow control means for receiving said filtered vapor from said manifold by a fourth pipe;

a receiver, said receiver connected to receive said filtered vapor from said second flow control means by a fifth pipe, said receiver having therein a container for receiving said filtered vapor, said container being at a temperature to condense said filtered vapor into a filtered fluid of $N_2O_4$, and a means for cleansing said manifold, and said first and said second flow control means of $N_2O_4$, NOCl and NO, said cleansing means connected to said manifold by a sixth pipe having flow control means therein.

* * * * *